Sept. 28, 1948.  F. E. DENNY  2,450,036
SPROUTING OF BUDS
Filed May 12, 1945
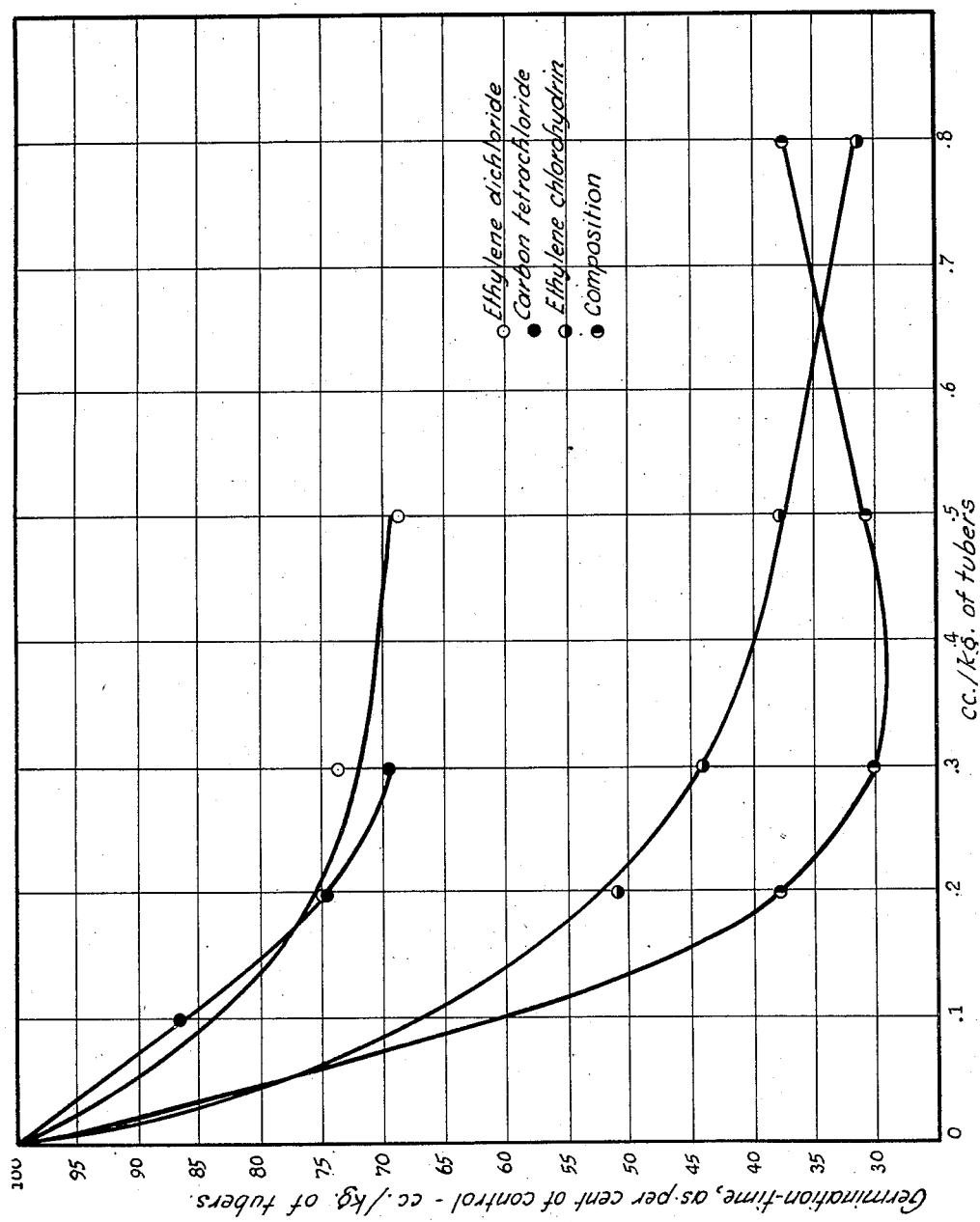
INVENTOR
*Frank Earl Denny*
BY
*Pennie, Davis, Marvin & Edmonds*
ATTORNEY Patented Sept. 28, 1948

2,450,036

UNITED STATES PATENT OFFICE 2,450,036

SPROUTING OF BUDS

Frank Earl Denny, Yonkers, N. Y., assignor to Boyce Thompson Institute for Plant Research, Inc., a corporation of New York Application May 12, 1945, Serial No. 593,521

4 Claims. (Cl. 47—58)

This invention relates to the growth of plants and has for its object certain improvements in materials for hastening the sprouting and development of buds, especially to shorten the period of rest or dormancy. The invention provides an improved composition of materials including ethylene chlorohydrin ($CH_2ClCH_2OH$) having a synergistic effect, and a method of treating buds with the composition.

In my Patent No. 1,628,035, I describe the treatment of bulbs with ethylene chlorohydrin in vapor or solution forms to break the rest period and cause prompt sprouting of the dormant buds. While the chlorohydrin treatment is effective from a technical point of view, its chances for commercial extension would be improved if the amount of ethylene chlorohydrin required for treatment could be reduced. For example, in treating Irish potato tubers (intact, not cut into pieces), the necessary amount is about 1 cc. of a 40% solution per lb. of tubers, or about 1 cc. of the pure chemical per kg. of tubers. Since the B. P. of the 40% solution is about 98° C., and that of the anhydrous ethylene chlorohydrin is about 128° C., there is some difficulty in obtaining evaporation of the needed amount of the ethylene chlorohydrin in the practices heretofore.

I have now discovered a composition of chemical compounds comprising ethylene chlorohydrin which produces at least an equal, and possibly a superior, effect in advancing sprouting which has such potent capacity to act on the buds that a smaller amount of the chlorohydrin may be used. My invention provides a composition comprising ethylene chlorohydrin, ethylene dichloride and carbon tetrachloride which is synergistic in its comparative effects on buds in that the smaller amounts of ethylene chlorohydrin the composition are as effective as chlorohydrin alone.

A composition comprising, for example 7 parts of ethylene chlorohydrin, 3 parts ethylene dichloride and 1 part carbon tetrachloride (parts by volume) is as effective in inducing germination, as a larger amount of ethylene chlorohydrin when used alone. For example, comparative results may be obtained by the use of much less total ethylene chlorohydrin, only about one-third as much, in fact, being needed.

This gain is not due to any superiority of the ethylene dichloride or carbon tetrachloride since these two, when acting separately, are not as effective as the chlorohydrin constituent. It is believed that this combination of the three chemicals exhibits synergism, i. e., an effect due to the combination which is greater than the sum of the effects of three components each acting separately.

The composition of the invention is preferably used at room temperature and should not be used at temperatures above 80° F. Since the composition vaporizes freely at room temperature, it is necessary merely to place the required amount of composition in a closed container with the plant or plant organ.

The invention will be better understood after considering the following discussion taken in conjunction with the accompanying drawing which shows the result of a series of measurements of the effects of the synergistic composition of the invention upon the germination-time of 9 different lots of dormant potato tubers, representing different varieties, sizes, and periods after harvest at which the treatments were applied. The composition was vaporized in a confined space in contact with the tubers. The base line shows the amounts of the single and combined chemicals used per kilogram of tubers treated. The scale at the left was obtained by expressing the average time of germination of the treated tubers as a per cent of the average time for the germination of the control (not-treated tubers). Each plotted point is based upon the germination record of a large number of tuber-cuttings. The lines as drawn are the curves of best fit, as computed by the method of least squares.

The graph shows that for, say, 0.2 cc. of the composition, the plotted point is opposite 38.5 on the left-hand scale, and that the gain due to the composition over the control is 100—38.5=61.5. When 0.2 cc. of the composition is taken, the corresponding amounts of the three components are 0.1273 cc. of ethylene chlorohydrin, 0.0545 cc. of ethylene dichloride, and 0.0182 cc. of carbon tetrachloride (since it was found that there was no change in volumes upon mixing the three chemicals). The point on the curve corresponding to 0.13 cc. of ethylene chlorohydrin is opposite the value 62.0, and the gain due to chlorohydrin is 100—62.0=38.0. Likewise, the value found for 0.055 cc. of ethylene dichloride is 90.0, and the gain due to the dichloride is

100—90.0=10.0

Finally, the point opposite 0.02 cc. on the carbon tetrachloride curve is found to be 97.5, and the gain due to carbon tetrachloride is 100—97.5=2.5. Therefore, the sum of the gains due to the three components is 38.0+10.0+2.5=50.5, while the gain due to the composition of the combined chemicals is 61.5.

This method of summing is the most favorable one for the components acting separately, because each component is permitted to show the largest effect possible with the given amount of chemical, and is permitted to have this gain independently of the effect of the other components.

The optimum amount of ethylene chlorohydrin is about 1.0 cc. of the anhydrous chemical per kg. of tubers, while the optimum for the composition is about 0.33 cc. per kg., i. e., at about one-third the amount of chemical. Since ethylene chlorohydrin is much the most expensive of the three, the gain in cost by the use of the composition is considerable. Assuming that 0.4 cc. of the composition is equivalent to 0.8 cc. of ethylene chlorohydrin (a rather conservative estimate), the comparative costs for treating potatoes by ethylene chlorohydrin and the composition is very much in favor of the composition based on current prices for chemicals.

The composition of the invention may also be used for treating dormant woody plants, i. e., woody plants that do not show breaking of buds and growth on being placed under conditions ordinarily favorable for growth. In experiments on woody plants, for example, the plant Rhodotypos, pots were placed in ash-cans and exposed to vapors of the chemicals for 48 hours and then were placed in the greenhouse. The results show that the composition is at least as effective as ethylene chlorohydrin and at a concentration of about one-third that of the chlorohydrin.

The composition of the invention is preferably applied to the buds as a vapor but may be applied to the buds in any suitable manner. For example, the composition may be applied in sprays or aerosols with suitable carriers which will hold the composition near the buds for a sufficient length of time.

I claim:

1. The composition for hastening the sprouting of buds comprising about 7 parts by volume ethylene chlorohydrin, about 3 parts by volume ethylene dichloride, and a small amount of carbon tetrachloride.

2. The method of hastening the sprouting of buds which comprises treating the buds with a composition comprising ethylene chlorohydrin, ethylene dichloride, and carbon tetrachloride.

3. The method of hastening the sprouting of buds which comprises treating the buds with a composition comprising ethylene chlorohydrin, ethylene dichloride, and carbon tetrachloride, the said composition being vaporized and the vapors caused to contact the buds.

4. The method of hastening the sprouting of buds which comprises treating the buds with a composition comprising about 7 parts by volume ethylene chlorohydrin, about 3 parts by volume ethylene dichloride, and about one part of carbon tetrachloride.

FRANK EARL DENNY.

REFERENCES CITED

The following references are of record in the file of this patent:

UNITED STATES PATENTS

| Number | Name | Date |
|---|---|---|
| 1,628,035 | Denny | May 10, 1927 |
| 2,258,291 | Jones | Oct. 7, 1941 |

OTHER REFERENCES

McCallum, 20th Ann. Rpt., Ariz. Agr. Expt. Sta., pp. 584–586, pub. 1910.

Denny, "Chemical Treatments," pub. 1928, Ind. Eng. Chem., vol. 20, pp. 578–581.

Hitchcock, "Effects Obtained with Mixtures," pub. 1940. Contrib. Boyce Thompson Inst., vol. II, pp. 143–160.

Metcalf, "Destructive and Useful Insects," 2d ed., 1939, McGraw-Hill, N. Y., pp. 276, 288, 808.

Tech. Bul. 162, U. S. Dept. Agr., Mar. 1929, pp. 8, 16, 49.